Patented Sept. 13, 1949

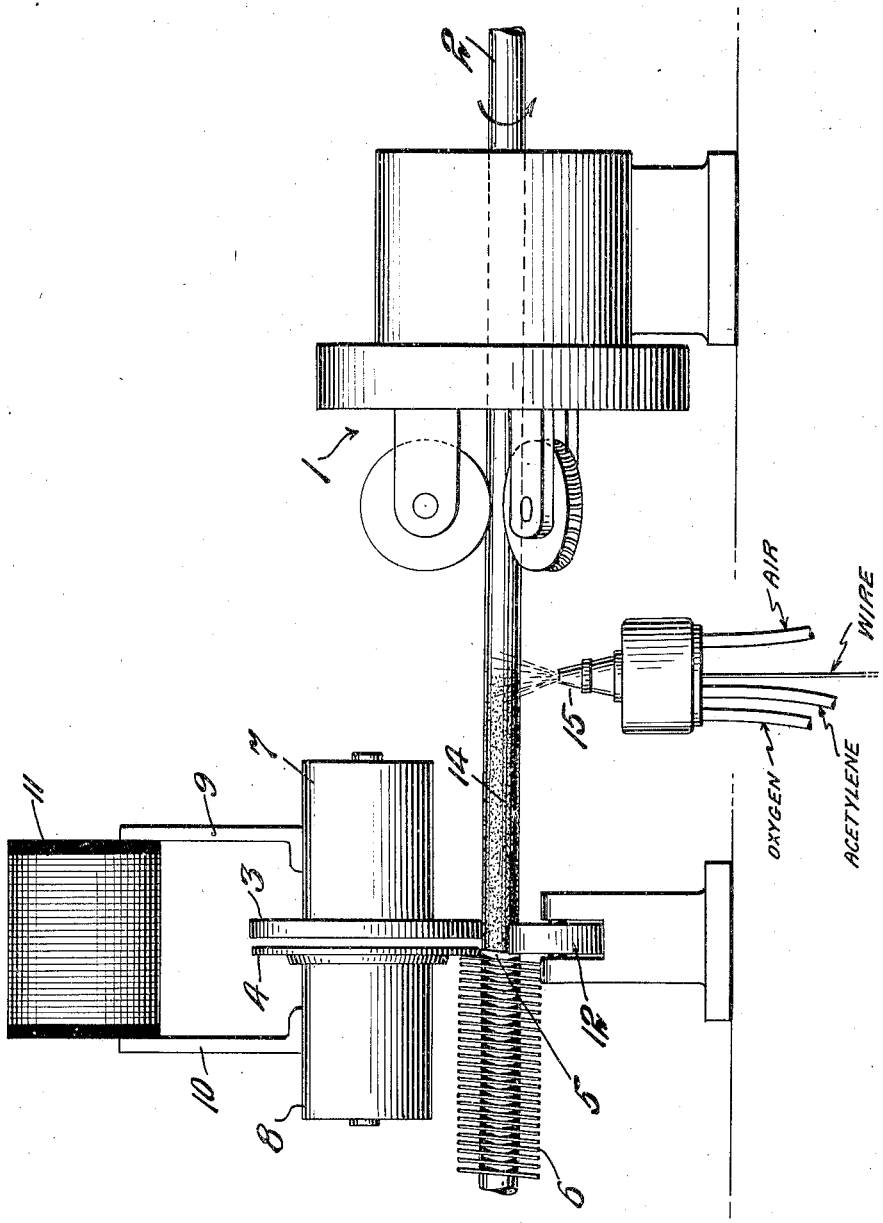

2,481,626

UNITED STATES PATENT OFFICE 2,481,626

ELECTRIC RESISTANCE WELDING OF HARD TO WELD METALS, PARTICULARLY FOR FINNED TUBING

Emil A. Schryber, Lynbrook, N. Y., assignor to Extended Surface Division of David E. Kennedy, Inc., Brooklyn, N. Y., a corporation of New York Application April 10, 1946, Serial No. 661,034

4 Claims. (Cl. 219—10)

The invention herein disclosed relates to welding methods.

While particularly adapted to the welding of fin material on tubing and here so disclosed, the invention is not limited to such operations and is of utility for welding purposes generally.

Objects of the invention are to accomplish the welding of metals ordinarily difficult to weld, for example the welding of a copper fin strip to copper tubing. In such a case the zone of high resistance at the point of contact required for effective resistance welding is lacking.

The present invention aims to overcome that deficiency and to make it possible to weld copper to copper, or to other metals which have heretofore been found difficult to weld.

Special objects of the invention are to accomplish the welding of the so-called "hard to weld" metals rapidly, efficiently and at low cost and with mechanism of relatively simple and inexpensive construction.

Other desirable objects attained by the invention are set forth or will appear in the course of the following specification.

The drawing accompanying and forming part of the specification illustrates a present practical embodiment of the invention. The structure and the various steps, however, may be modified and changed, all within the true intent and broad scope of the invention as herein defined and claimed.

The single figure in the drawing is a broken front elevation of a special tube finning machine having the invention incorporated therein.

The machine illustrated is of the general type disclosed in the Emil A. Schryber Patent No. 2,344,790 of March 21, 1944, and involving a special chuck 1 for rotating and longitudinally advancing tubing 2 to companion electrodes 3, 4, bearing on the tubing and on the base strip 5 of the finning material 6, respectively.

The electrodes are in the form of discs free to rotate in the holders 7, 8, at the ends of the horns 9, 10, of the welding transformer 11.

The tubing is supported opposite the electrodes by rollers, one of which appears at 12.

To create the required high resistance welding zone, a metal of lower conductivity is sprayed between the higher conductivity metals such as 2 and 5.

This spray coat, represented at 14, may be a thin sheet of steel applied by a metallizing gun indicated at 15, located between the chuck and the electrode rolls.

In practice the metallizing gun may be mounted as close as possible to the electrodes at a point where with the rotary and longitudinal travel of the tubing, the spray coat will fully harden but will still be hot, thus to take advantage of the factor of lower conductivity at high temperature.

With this arrangement the zone of heat in effect can be started in the act of applying it to the tubing, the heat then building up the more rapidly on the coating reaching the first electrode wheel 3 and entering the welding circuit between the two electrodes. The formation of the molten welding pool beneath the strip holding electrode is therefore accelerated and the welding can be carried on at a rapid rate. Also, once the weld action is started it is self sustaining and localized.

The spray metal is granular in structure and therefore offers greater resistance at the point of contact than would interposed metal, for instance, having a highly polished surface.

The metallizing gun may be one of present acceptable commercial design and preferably such that it may be regulated and controlled to stop and start and deposit the metal in a predetermined, uniform thin layer more or less synchronized with the travel of the stock.

The low conductivity layer may be an alloy metal coating and this sprayed metal, the strip metal and the tube metal may all be similar or dissimilar in base metal content. By using various metals in the metal spray and controlling the heat at the joining point, the same or different kinds of metals may be united and for the extended surface finning illustrated or many other purposes.

What is claimed is:

1. The herein disclosed method of welding "hard to weld" metals which comprises introducing a hot molten layer of lower electrical conductivity metal between said "hard to weld" metals and then passing welding current through said metals while said introduced layer is still in hot condition.

2. The herein disclosed method of welding "hard to weld" metals which comprises metallizing the surface of one of said metals with a thin hot molten layer of lower electrical conductivity metal and then while said layer is still hot, pressing the metals together with said metallized surface between the two and passing welding current through said metals and metallized surface.

3. The herein disclosed method of welding "hard to weld" metals which comprises hot spraying a thin molten layer of lower electrical conductivity metal on the surface of one of the metals, pressing the metals together with said sprayed layer between the two and while said layer is still hot, passing welding current through the metals.

4. The herein disclosed method of manufacturing finned tubing with metals which are hard to weld and comprising metallizing the surface of the tubing with a thin hot molten layer of lower conductivity metal while continuously rotating and longitudinally advancing the tubing past a metallizing station and then while the metallizing coating is still hot, pressing a fin strip helically onto the hot metallized surface of the rotating and advancing tubing and passing welding current through the fin strip and tubing while said fin strip is being wound onto the tubing over said hot metallized surface coating.

EMIL A. SCHRYBER.

REFERENCES CITED

The following references are of record in the file of this patent:

UNITED STATES PATENTS

| Number | Name | Date |
|---|---|---|
| 2,151,758 | Gier | Mar. 28, 1939 |
| 2,232,176 | Guthrie | Feb. 18, 1941 |
| 2,261,137 | Brown | Nov. 4, 1941 |
| 2,330,943 | Anderson et al. | Oct. 5, 1943 |
| 2,344,790 | Schryber | Mar. 21, 1944 |
| 2,367,715 | Chapman | Jan. 23, 1945 |